United States Patent Office 3,850,946
Patented Nov. 26, 1974

3,850,946
3-THIAZOL-5'-OXY-AMINOPROPANOL CARDIOVASCULAR AGENTS
John A. Edwards, Los Altos, Calif., assignor to Syntex (U.S.A.) Inc.
No Drawing. Filed July 10, 1972, Ser. No. 269,974
Int. Cl. C07d 91/30
U.S. Cl. 260—302 R          12 Claims

ABSTRACT OF THE DISCLOSURE

1-Amino-3-(5-thiazoloxy)-2-propanol and substituted 1-amino derivatives thereof; 3-(5-thiazoloxy)-1,2-epoxypropane; 5-(thiazol-5 - oxymethylene) - oxazolidine and N-subtituted oxazolidine derivatives thereof and methods of preparing such compounds. The above 1-amino-3-(5-thiazoloxy)-2-propanol and derivatives exhibit cardiovascular activity and are useful for the treatment of abnormal heart conditions in mammals. 3-(5-Thiazoloxy)-1,2-epoxypropane is useful as an intermediate for the aforementioned cardiovascular agents. The 5-(thiazol-5-oxymethylene)-oxazolidine and derivatives are intermediates for aforementioned cardiovascular agents and further exhibit cardiovascular activity and thus are useful in the treatment of abnormal heart conditions in mammals. The 1-amino-3-(5-thiazoloxy)-propanol and derivatives can be prepared by base or acid hydrolysis of the corresponding 5-(thiazol-5 - oxymethylene) - oxazolidine or derivatives; or by treatment of the corresponding 3-(5-thiazoloxy)-2,3-epoxypropane or derivative with the desired amine or amino-derivatives.

BACKGROUND OF THE INVENTION

1. Field of the Invention

This invention relates to 3-(thiazol-5-oxy)-propane derivatives and thiazol-5'-oxy-methylene-oxazolidine derivatives and to methods of preparing such compounds. In a further aspect, this invention relates to 1-amino-3-(thiazol-5-oxy)-2-propanol derivatives thereof optionally substituted at the 1-amino positions, and to methods of preparing and using such compounds. In a still further aspect this invention relates to 3-(thiazol-5-oxy)-1,2-epoxypropane and to methods of preparing and using these compounds. In another aspect this invention relates to thiazol-5'-oxy-methylene-oxazolidine and derivatives thereof and to methods of preparing and using such compounds.

This invention also relates to pharmaceutical compositions comprising 1-amino-3-(thiazol-5-oxy)-2-propanol and derivatives thereof, and/or thiazol-5'-oxy-methyleneoxazolidine and derivatives thereof, and to methods of applying such compositions for the treatment of mammals.

2. The Prior Art

At the present time the compound generally relied on for the treatment of heart failure and especially acute heart failure is 3,4-dihydroxy - α - [(isopropylamino) methyl]-benzyl alcohol (note U.S. Pats. 2,308,237 and 2,715,141). This compound produces a marked increase in heart rate and contractile force but regrettably is short acting and decreases blood pressure. Further, this compound has, as an undesirable side effect, a propensity to induce arrhythmia. Accordingly, the present invention relates to the discovery of compounds which are useful in the treatment of abnormal cardiovascular conditions, increasing heart failure, and which are long acting and exhibit only minimal effects on blood pressure and possess a very low arrhythmogenic potential. These compounds are also position isomers of the corresponding compounds described in application Ser. No. 193,172, filed Oct. 27, 1971, now abandoned.

SUMMARY

In summary the compounds of the invention can be represented by the following generic formula:

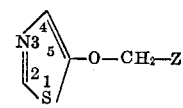

wherein Z is selected from the group having the formulas:

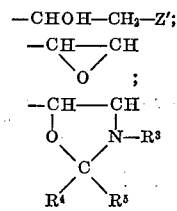

wherein Z' is amino or amino derivative or nitrogen heterocycle; $R^3$ is hydrogen, lower alkyl aryl or arylalkyl; $R^4$ and $R^5$ are independently selected from the group of hydrogen, lower alkyl, arylalkyl or together with the carbon atom to which they are joined form a cycloalkyl having from 5 through 7 carbon atoms.

Also encompassed within the invention are pharmaceutically acceptable salts of the above compounds wherein Z is —CHOHCH$_2$—Z'.

In summary the process of the invention of preparing the compounds, of the invention, wherein Z is $$-CH\underset{O}{-\!-\!-}CH$$

comprises converting 3-(thiazol-5-oxy)-1-alkylsulfonyl or phenylsulfonyl-2 - propanol into 1,2 - epoxy - 3 - (thiazol-5-oxy)-propane typically via treatment with a strong base.

In summary the process of the invention for preparing the compounds, of the invention, wherein Z is the group —CHOH—CH$_2$—Z' comprises treating the compounds of the invention wherein Z is $$-CH\underset{O}{-\!-\!-}CH$$

with ammonia or amine having the desired $R^1$ and $R^2$ substituent. Alternatively these compounds can be prepared, according to the invention, by hydrolysis of the corresponding Z is oxazolidine compounds of the invention.

In summary the process of the invention of preparing the compounds of the invention wherein Z is an -oxazolidine group comprises condensation of 5-bromothiazole or 5-chlorothiazole with a 5-hydroxymethyl-oxazolidine having the desired N-substituent. Alternatively the oxazolidine compounds can be prepared by treatment of the corresponding compounds of the invention where Z is an aminoethanol derivative.

In summary the pharmaceutical compositions of the invention include both solutions and solids or powders comprising one or more of the compounds, of the invention, wherein Z is an aminoethanol derivative and/or one or more compounds, of the invention, wherein Z is an oxazolidine derivative in combination with a suitable pharmaceutical solution (e.g. sterile water) or pharmaceutical solid excipients.

The invention will be further described herein below.

FURTHER DESCRIPTION OF THE INVENTION AND PREFERRED EMBODIMENTS

The compounds of the invention can be represented by the following sub-generic formulas:

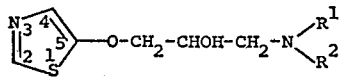

(I)

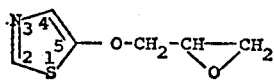

(II)

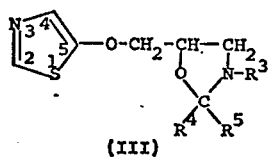

(III)

wherein $R^1$ and $R^2$ are independently selected from the group of hydrogen, lower alkyl, cycloalkyl having from 3 through 7 ring atoms, aryl, arylalkyl, lower alkylaryl, hydroxy lower alkyl, (lower alkoxy) lower alkyl, adamantyl, lower alkyl (N-heterocyclic having from 5- through 7 ring atoms including one or two heteroatoms selected from the group of nitrogen, oxygen and sulfur and wherein at least one of said heteroatoms is nitrogen) and the group

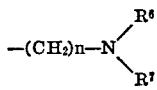

wherein $R^6$ and $R^7$ are independently hydrogen or lower alkyl, and $n$ is a whole integer of from 2 to 6, or $R^1$ and $R^2$ together with the nitrogen atom to which they are joined form a nitrogen heterocyclic having from 5 through 7 ring atoms having 1 or 2 hetero atoms selected from the group consisting of nitrogen, oxygen and sulfur and wherein at least one of said hetero atoms is nitrogen or $R^1$ and $R^2$ form a substituted nitrogen heterocyclic having from 5 through 7 ring atoms including one or two heteroatoms selected from the group of nitrogen, oxygen and sulfur and wherein at least one of said heteroatoms is nitrogen and having one or two substituents independently selected from the group of lower alkyl, and hydroxy(lower alkyl);

$R^3$ is hydrogen, lower alkyl, aryl, or arylalkyl; and $R^4$ and $R^5$ are independently selected from the group of hydrogen, lower alkyl, arylalkyl or together with the carbon atom to which they are joined form a cycloalkyl having from 5 through 7 carbon atoms.

Also encompassed within the invention are pharmaceutically acceptable salts of the compounds of formula I.

The compounds of the invention have an asymmetric carbon atom in the propane side chain and thus exist as optical isomers. Correspondingly the above formulas are intended to represent the respective individual (+) and (−) optical isomers as well as mixtures of such isomers and the individual isomers as well as mixtures thereof are encompassed within the invention. Where the compounds of the invention have 1-positioned substituents, on the propane chain, which have asymmetric atoms, the compounds exhibit further optical activity with respect to such asymmetric atoms. Correspondingly, formulas I and III are intended to represent the individual respective optical isomers as well as mixtures of such isomers and the individual isomers as well as mixtures thereof are encompassed within the invention.

As used herein above and below, the following terms have the following meaning unless expressly stated to the contrary.

The term lower alkyl refers to both straight and branched chain alkyl groups having a total of from 1 through 6 carbon atoms and thus includes primary, secondary and tertiary alkyl groups. Typical lower alkyls include, for example, methyl, ethyl, n-propyl, isopropyl, n-butyl, t-butyl, n-hexyl and the like. The term cycloalkyl refers to cyclic hydrocarbon groups having from 3 through 7 carbon atoms such as, for example, cyclopropyl, cyclopentyl, cycloheptyl, and the like. The term lower alkoxy refers to the group having the formula R′O— wherein R′ is lower alkyl. Typical alkoxy groups include, for example, methoxy, ethoxy, t-butoxy and the like. The term (lower alkoxy) lower alkyl refers to the group —R′—OR′ wherein R′ is lower alkyl and OR′ is lower alkoxy. The term hydroxy lower alkyl refers to groups having the formula HOR′— wherein R′ is lower alkyl. Typical hydroxyalkyl groups include, for example, hydroxymethyl, α-hydroxyethyl, β-hydroxypropyl, hydroxyisopropyl, hydroxy-t-butyl and the like. The term halo refers to iodo, bromo, chloro and fluoro groups.

By the term aryl is meant a group containing one aromatic ring having up to 10 carbons and preferably is phenyl. By the term alkylaryl is meant a substituted phenyl group having one or more alkyl substituents and having up to 10 carbon atoms such as o-tolyl, m-tolyl, p-isopropylphenyl, 2,3-dimethylphenyl, 3,5-dimethylphenyl, and the like. By the term arylalkyl is meant a (phenyl or substituted phenyl) substituted alkyl group such as benzyl, phenylethyl, o-, m-, or p-methylbenzyl, β-(m,p-dimethoxyphenyl)ethyl and the like preferably having up to 10 carbons. The term substituted phenyl refers to phenyl groups substituted at one or more of the ortho, meta or para positions with a hydroxy, lower alkyl, acyloxy, lower alkoxy or halo groups. Typical substituted phenyl groups include, for example, p-hydroxyphenyl, p-tolyl, p-acetoxyphenyl, m,p-dimethoxyphenyl, p-nitrophenyl, p-fluorophenyl, p-chlorophenyl and the corresponding ortho and meta isomers of the above listed mono-substituted para isomers and the like.

The term lower alkylamino refers to the group having the formula R′HN— wherein R′ is lower alkyl. The term dialkylamino refers to the group having the formula $R_1′R_2′N$ wherein $R_1′$ and $R_2′$ are independently lower alkyl. Typical dialkylamino groups include, for example, dimethylamino, N-methyl-N-ethylamino, diethylamino, N-t-butyl-N-isopropylamino, and the like.

The term N-heterocycle or nitrogen heterocycle refers to both saturated and unsaturated heterocyclics having from 5 through 7 ring atoms, one of which is nitrogen and which can optionally also contain a second heterocycle ring atom selected from the group of nitrogen, sulfur and oxygen. Also encompassed within the term are substituted N-heterocyclics having one or two substituents independently selected from the group of lower alkyl, hydroxylower alkyl, and halo. Typical N-heterocycles thus include, for example, those groups having the formulas:

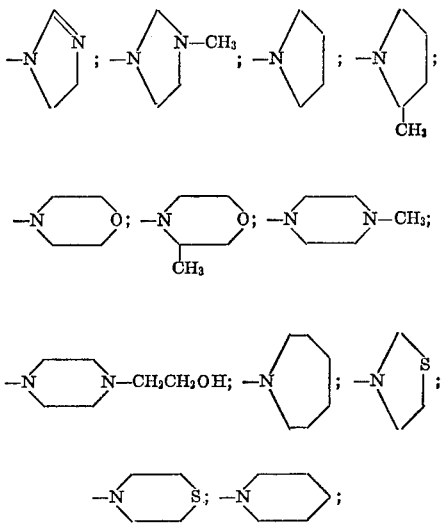

and the like.

The term N-heterocycle alkyl refers to a lower alkyl group having a N-heterocyclic substituent as defined herein above. Such groups can be represented by the formula XR'— wherein X is N-heterocyclic and R' is lower alkyl.

The term pharmaceutically acceptable salts refers to pharmaceutically acceptable hydrogen-anion addition salts which do not adversely affect the pharmaceutical properties of the parent compounds. Suitable inorganic anions include, for example, chloride, bromide, iodide, sulfate, phosphate, carbonate, nitrate, hydrocarbonate, sulfite, sulfate and the like. Suitable organic anions include, for example, acetate, benzoate, lactate, picrate, propionate, butyrate, valerate, tartrate, maleate, fumarate, citrate, succinate, tosylate, ascorbate, pamoate, nicotinate, adipate, glyconate, and the like.

Typical illustrations of the compounds of formula I can be had, for example herein below, by reference to Examples 4 through 7. The preferred compounds of formula I are:

1-amino-3-(thiazol-5-oxy)-2-propanol;
1-methylamino-3-(thiazol-5-oxy)-2-propanol;
1-isopropylamino-3-(thiazol-5-oxy)-2-propanol;
1-t-butylamino-3-(thiazol-5-oxy)-2-propanol;
1-β-hydroxyethylamino-3-(thiazol-5-oxy)-2-propanol;
1-[β-(3,4-dimethoxyphenyl)]-ethylamino-3-(thiazol-5-oxy)-2-propanol; and especially
1-isopropylamino-3-(thiazol-5-oxy)-2-propanol.

The compound of formula II is illustrated herein below in Example 3.

Typical illustrations of the compounds of formula III can be had, herein below, by reference to Examples 9 and 12.

The preferred R$^4$- and R$^5$-substituents are those wherein R$^4$ and R$^5$ are each hydrogen or are each methyl. The preferred R$^3$ groups are hydrogen, methyl, isopropyl, t-butyl, β-(3,4-dimethoxyphenyl)-ethyl and especially isopropyl.

The particularly preferred compounds of formula III are:

thiazol-5'-oxy-5-methylene-oxazolidine;
thiazol-5'-oxy-5-methylene-N-methyloxazolidine;
thiazol-5'-oxy-5-methylene-N-isopropyloxazolidine;
thiazol-5'-oxy-5-methylene-N-t-butyloxazolidine;
thiazol-5'-oxy-5-methylene-N-[β-(3,4-dimethoxyphenyl)ethyl]-oxazolidine; and especially
thiazol-5'-oxy-5-methylene-N-isopropyloxazolidine.

The preferred pharmaceutical acceptable salts are hydrogen addition salts of chloride, bromide, sulfate, maleate, lactate, tartrate, succinate and especially chloride and maleate. Thus the preferred salts are the preferred hydrogen-anion addition salts of formula I and correspondingly the particularly preferred salts are the preferred hydrogen-anion addition salts of the preferred and particularly preferred compounds of formula I and especially the hydrochloride and maleate addition salts.

The process, of the invention for preparing the compounds of formulas I and II, can be conveniently represented by the following schematic overall reaction equation:

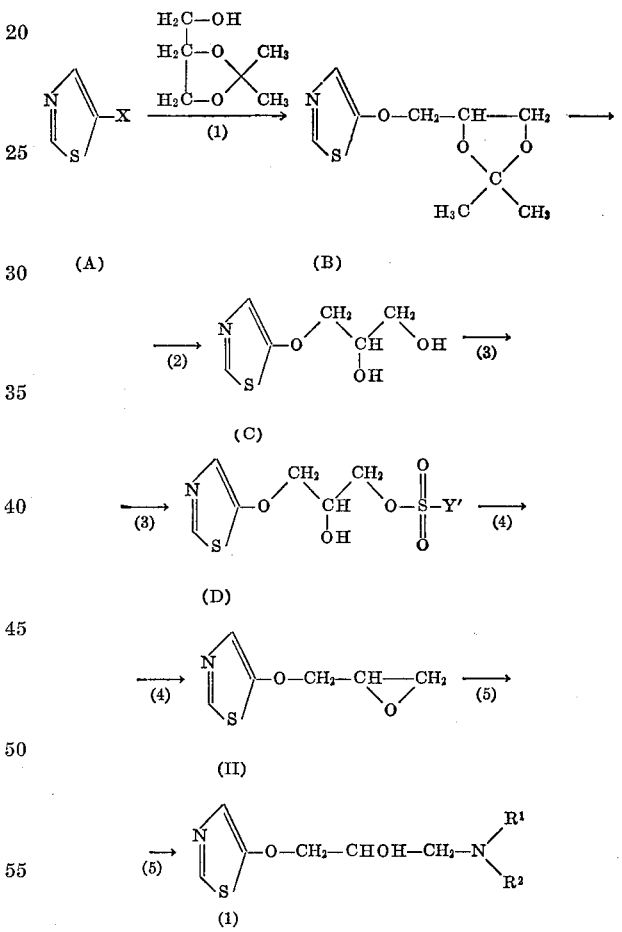

wherein X is bromo or chloro, Y' is alkyl or phenyl, and R$^1$ and R$^2$ have the same meaning as set forth herein above.

Step 1 of the above process can be effected by treating the thiazole compound of formula A with glycerol acetonide in a suitable inert solvent, in the presence of an alkali metal hydride. Typically, this treatment is conducted at temperatures in the range of about from 100° C., to 150° C. for about from one to five minutes, using mole ratios in the range of about from 1 to 100 moles of glycerol acetonide per mole of compound A. However, temperature, reaction times, and mole ratios both above and below can also be used. Suitable alkali metal hydrides which can be used include, for example, sodium hydride, potassium hydride, calcium hydride, lithium hydride and the like. Preferably an excess of glycerol acetonide is used as the inert organic solvent. However, other suitable inert organic solvents which can also be used include, for example, monoglyme, tetrahydrofuran, diglyme, dimethylformamide, glycerol and the like. Also where an inert organic solvent having a normal boiling point below 100° C. is used, the treatment should be conducted under sufficient pressure to provide a minimum liquid temperature of 100° C. Best results are typically obtained by using an excess of glycerol acetonide as the solvent and conducting the treatment at the normal reflux temperature of the system. Further by using the optically pure (+) glycerol acetonide isomer (see *J. Biol. Chem.* v. 128, p. 463 (1939)) or the optically pure (−) glycerol acetonide isomer (see *J. Am. Chem. Soc.* v. 67, p. 944 (1945)), the corresponding (+) or (−) optically active isomer of formula B is obtained. Correspondingly, wherein a (+) and (−) isomer mixture of the glycerol acetonide is used, the product will similarly be a mixture of isomers. This optically active isomer relationship between the starting materials and products exists throughout all the steps of various processes described herein. Typically, and conveniently, a racemic glycerol acetonide isomer mixture will be used and correspondingly the product in this instance will be a racemic mixture.

Typically, 5-bromothiazole will be used as the starting material of formula A, as this compound can be conveniently prepared via the procedure described by Beyerman et al. in *Rec. Trav. Chim.* v. 73, p. 325 (1954).

Step 2, can be conveniently effected by treating the compound of formula B with a suitable organic or inorganic acid, preferably in a suitable inert organic solvent. Typically this treatment is conducted at temperatures in the range of about from 0° to 65° C. and preferably about from 15° to 30° C., for about from three minutes to 24 hours and preferably about from 4 to 16 hours. However, temperatures, reaction times and mole ratios both above and below these ranges can also be used. Suitable inorganic acids which can be used include, for example, hydrochloric acid, hydrobromic acid, sulfuric acid, phosphoric acid and the like. Suitable organic acids which can be used include, for example, formic acid, oxalic acid, acetic acid, propionic acid, and the like. Suitable solvents which can be used include, for example, water, methanol, acetone, monoglyme, ether and the like. Good results are typically obtained by using aqueous formic acid solution or aqueous hydrochloric acid in methanol.

Step 3 of the above process can be effected by treating the compound of formula C with a suitable phenyl sulfonyl chloride or bromide or alkyl sulfonyl chloride or bromide, in a suitable organic solvent. The particular sulfonyl derivative used is largely immaterial since the sulfonyl substituent is split off during the next step. Thus, typically other phenyl sulfonyl chloride or bromide or alkyl sulfonyl chloride or bromide derivatives can also be used. Typically this treatment is conducted at temperatures in the range of about from 0° to 60° C. and preferably about from 0° to 25° C. for about from five minutes to 18 hours, preferably about from 10 minutes to 45 minutes, using mole ratios in the range of about from 1.0 to 1.1 moles of sulfonyl derivative per mole of compound of formula C. However, temperatures and treatment times, both above and below these ranges can also be used. Suitable phenyl sulfonyl chloride or bromides, which can be used include, for example, benzene sulfonyl chloride, benzene sulfonyl bromide, or p-toluene sulfonyl chloride, p-ethyl benzene sulfonyl bromide, and the like. Suitable alkyl sulfonyl chlorides, and bromides, which can be used include, for example, methane, sulfonyl chloride, methane sulfonyl bromide and the like. Suitable organic solvents which can be used include, for example, pyridine, triethylamine or other tertiary amines, and the like.

Step 4 can be conveniently effected by treating the compound of formula D with a strong base preferably in an inert organic solvent. Conveniently this treatment is conducted by adding a strong base directly to the product reaction mixture of step 3 without separation of the product of formula D from the reaction mixture. The treatment can, of course, also be applied to the isolated product of Formula D. Typically, this treatment is conducted at temperatures in the range of about from 0° to 50° C., preferably about from 20° to 40° C. for from ½ hour to 3 hours, and preferably about from ½ hour to 1 hour. However, temperatures and reaction times both above and below these ranges can also be used. Suitable strong bases which can be used include, for example, alkali metal hydroxides such as, for example, sodium hydroxide, potassium hydroxide, and the like, and alkali metal alkoxides such as, for example, sodium methoxide, potassium methoxide, and alkyl or aryl lithiums such as butyl lithium, octyl lithium, phenyl lithium and the like. Suitabe inert organic solvents include, for example, monoglyme, ethyl ether, benzene and the like.

Step 5 can be conducted by treating the intermediate product of formula II, of the invention, with the desired $R^1$, $R^2$ amine or amino derivative or N-heterocyclic derivative, including amines incorporated in cyclic systems. For example by treating the compound of formula II with alcoholic solution of ammonia, the corresponding compounds of formula I wherein each of $R^1$ and $R^2$ is hydrogen is obtained. Similarly, treatment with a monoalkyl amine will yield the corresponding compound of formula I wherein one of $R^1$ or $R^2$ is the corresponding alkyl group and the other is hydrogen, and where a dialkyl amine is used, each of $R^1$ and $R^2$ will be an alkyl group. Correspondingly, using a nitrogen heterocyclic such as, for example, piperidine; pyrrolidine; or morpholine will afford the corresponding $N_1$-piperidino; $N_1$-pyrrolidinyl; or $N_1$-morpholino, respectively, compounds of formula I. Further although optimum conditions and solvents will vary with the particular intermediate of formula II and ammonia or amino-type derivatives used, the treatment is typically conducted at temperatures in the range of about from 25° to 100° C. for about from 10 minutes to 18 hours. However, temperature ranges both above and below these can also be used. Suitable solvents which can be used include, for example, monoglyme, methanol, ethanol, pyridine and the like.

Preferably, with the exception of step 4 which, as noted above, is conveniently conducted by addition to the previous product reaction mixture, the respective products of each step are isolated prior to their subsequent use as starting materials for the next succeeding step. Separation and isolation can be effected by any suitable separation or purification procedure such as, for example, evaporation, crystallization, chromatography, thin-layer chromatography, etc. Specific illustrations of typical separation and isolation procedures can be had by reference to the corresponding examples described herein below. However, other equivalent separation or isolation procedures could, of course, also be used. Where an isomer mixture of the product of formula I is obtained, for example where racemic glycerol acetonide mixture has been used in step 1, the respective optically active (+) and (−) isomers can be resolved by conventional procedures. Such as, for example, by reacting the compounds of formula I with an optically active acid which will yield pure optical salts of the compounds of formula I and then isolating the respective (+) and (−) optical salts by repeated crystallization.

The compounds of formula I wherein one of $R^1$ or $R^2$ is hydrogen and the other is hydrogen, lower alkyl, or aryl-alkyl and the compounds of formula III can be prepared via an alternate process of the invention which

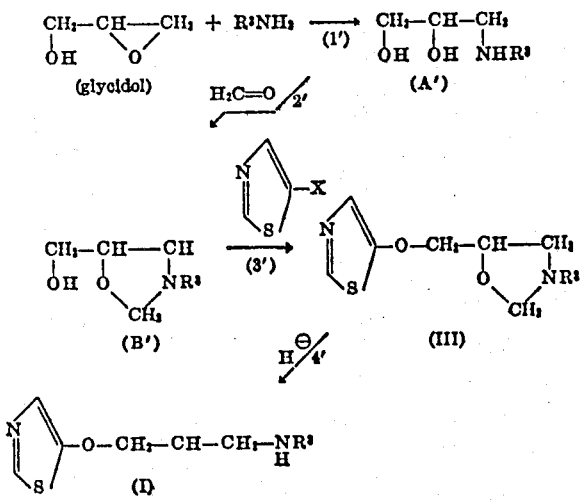

wherein $R^3$ and $X$ are as defined herein above.

Step (1') of the above process can be effected by treating glycidol with ammonia or the desired monosubstituted amine. Typically, this treatment is conducted at temperatures in the range of about from 20° C. to reflux and preferably at reflux, for about from 0.5 to 5 hours. Frequently, as the reaction is exothermic and typically will occur at ambient temperature, the reaction can be conducted at reflux without supplying external heat. Also wherein anhydrous ammonia or volatile amines are used, the reaction is typically conducted by passing the gaseous ammonia or substituted amine through a solution of glycidol. Alternatively, suitable inert organic solvents can be used but, typically are unnecessary as glycidol itself is a liquid at room temperature in which the respective substituted amines are usually soluble. Suitable substituted amines which can be used include, for example, methylamine, ethylamine, propylamine, isopropylamine, n-butylamine, t-butylamine, phenylethylamine, p-methylbenzyl, and the like.

Step 2' can be effected by treating the product of step 1', of formula A', with formaldehyde in a suitable inert organic solvent such as, for example, ethanol. Typically, this treatment is conducted at temperatures in the range of about from 20° C. below reflux to reflux and preferably at reflux about from 8 to 18 hours. Typically, the formaldehyde is used in the form of an aqueous solution.

Step 3' is preferably conducted in two phases. In the initial phase the 5-hydroxymethyl-oxazoline or 5-hydroxymethyl-3-substituted oxazolidine product of step 2' (i.e. formula B') is treated with an alkaline metal hydride, e.g. sodium hydride, in a suitable inert organic solvent. Typically, this treatment is conducted at temperatures in the range of about from 20° to 80° C. for about from 15 minutes to 5 hours. Preferably this treatment is conducted under anhydrous conditions and preferably conducted in the absence of air, e.g. under an inert gas, e.g. nitrogen. Inert organic solvents which can be used include, for example, dimethylformamide, monoglyme, diglyme and the like. The second phase of step 3' is conducted by treating the initial product reaction mixture with either 5-chloro or 5-bromothiazole. Typically, this treatment is conducted at temperatures in the range of about from 60° to 140° C. for about from 1 to 24 hours. Typically, the 2-halo thiazole reagent will be added to the reaction mixture in the form of a solution in a suitable inert organic solvent. Suitable inert organic solvents which can be used include, for example, dimethylformamide, monoglyme, diglyme, and the like. Again preferably the second phase will also be conducted under anhydrous conditions and preferably conducted in an inert gas such as, for example, nitrogen. Step 4' can be conveniently effected by simple acidic or basic hydrolysis of the intermediate of formula III. Thus, acid hydrolysis can be conveniently effected by treating the compound of formula III with a suitable inert organic acid such as, for example, acetic, formic, oxalic acid and the like or suitable acids such as, for example, hydrochloric, sulfuric, and the like. Preferably the hydrolysis is conducted under mildly acidic conditions. Similarly, basic hydrolysis can be conducted by treating the compound of formula III with a suitable base such as, for example, dilute sodium hydroxide, potassium hydroxide and the like. Preferably the hydrolysis can be conducted under mildly alkaline conditions. Alternatively, the hydrolysis can be conducted via exchange with a suitable ion exchange resin in either the $H^+$ or $OH^-$ form.

The compounds of formula III can also be prepared directly from the corresponding compounds of formula I:

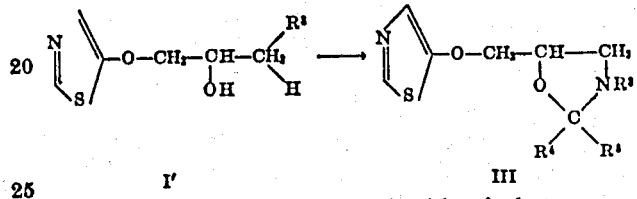

wherein $R^3$, $R^4$ and $R^5$ are as defined hereinabove.

This treatment can be conveniently effected by treating the corresponding compound of formula I' with a ketone, having the desired $R^4$ and $R^5$ substituents, and aluminum isopropoxide. Typically this treatment is conducted at temperatures in the range of about from 20° to 100° C. for about from 1 to 48 hours using mole ratios in the range of about from 1 to 150 moles of ketone and 1 to 10 moles of aluminum isopropoxide per mole of compound of formula I'.

Typically a substantial excess of ketone is used as the excess ketone usually will function as an inert organic solvent. Suitable ketones which can be used include, for example, acetone, cyclohexanone, cyclopentanone, cycloheptanone, and the like. Also in place of aluminum isopropoxide, the following compound can be used; aluminum t-butoxide.

Alternatively the above treatment can be effected in the case of the 2-spirocycloalkyloxazolidine compounds, of formula III (i.e. $R^4$ and $R^5$ together with the carbon atoms to which they are joined form a cycloalkyl), by treating the corresponding compound of formula I' with a cycloalkyl-one having the desired cycloalkyl group, in an inert organic solvent in the presence of potassium carbonate. Typically this treatment is conducted at temperatures in the range of about from 20° to 100° C. for about from 48 to 72 hours, using mole ratios in the range of about from 1 to 150 moles of cycloalkyl-one per mole of compound of formula I'. Suitable cycloalkyl-ones which can be used include, for example, cyclohexanone, cyclopentanone, cycloheptanone, and the like. In place of potassium carbonate, the following compounds can also be used; sodium carbonate, lithium carbonate, and the like.

And again, unless noted to the contrary, it is preferred that the respective products of each step or preparation step, described hereinabove, be separated and/or isolated prior to its use as starting material for subsequent steps. Separation and isolation can be effected by any suitable or purification procedure such as, for example, evaporation, crystallization, column chromatography, thin-layer chromatography, distillation, etc. Specific illustrations of typical separation and isolation procedures can be had by reference to the appropriate examples described herein below. However, other equivalent separation procedures could, of course, also be used. Also where an isomer mixture of the product of formula I or III is obtained, for example, wherein an isomeric mixture of glycerol acetonide or glycerol has been used in steps 1 and 1', respectively, the respective optically active (+) and (−)

isomers can be resolved by known procedures. Optimum resolution procedures can be obtained by routine trial and error procedures well within the scope of those skilled in the art.

The pharmaceuticaly acceptable acide addition salts of the compounds of formula I can be prepared via neutralization of the amino moiety in the parent compound with the desired acid-anion. Other pharmaceutically acceptable addition salts can then be conveniently prepared from the neutralization addition salts via anion exchange with a suitable ion exchange resin in the desired anion form.

The compounds of formulas I and III, of the invention, are useful in the treatment and palliation of cardiovascular abnormalities occurring in mammals The compounds are especialy useful in the treatment and palliation of acute heart failure (such as, for example, acute heart failure following myocardia infarction), myocardial depression following cardiac surgery, chronic heart failure of all etiologies, bradyarrhythmias, general cardiomypathic conditions and instances of complete heart block, occurring in mammals. The compounds are believed to achieve their therapeutic effect by affecting the β-adrenergic receptor sites and are believed to primarily function as β-adrenergic receptor stimulating agents.

The compounds of formulas I and III can be administered in a wide variety of dosage forms, either alone or in combination with other pharmaceutically compatible medicaments, in the form of pharmaceutical compositions suited for oral or parenteral administration. The compounds of formula I are typically administered as pharmaceutical compositions consisting essentially of the pharmaceutically acceptable salt of the compounds of formula I and a pharmaceutical carrier. The pharmaceutical carrier can be either a solid material or liquid, in which the compound is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups, or elixirs. A preferred mode of administration and composition is intravenous administration of a simple solution of the pharmaceutcally acceptable addiiton salts of the compounds of formula I in sterile water optionally containing small quantities of preservatives and/or buffering agents.

The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfite and the like.

The compounds of this invention are typically administered in dosages of about from 0.01 to 5 mg. per kg. of body weight. The precise effective dosage will, of course, vary depending upon the mode of administration, the condition being treated and the host.

A further understanding of the invention can be had from the following non-limiting Preparation and Examples. Also as used herein above and below unless expressly stated to the contrary, all temperatures and temperature ranges refer to the Centigrade system and the terms ambient or room temperature refer to about 20° C. The term percent or (%) refers to weight percent. The term molar equivalent (m. equiv.) refers to a quantity of reagent equal in moles to the moles of the immediately preceding reactant recited in the preparation and examples. Also unless expressly stated to the contrary, racemic mixtures are used as starting materials and correspondingly racemic mixtures are obtained as products. Also where necessary, preparations and examples are repeated to provide sufficient quantities of starting materials for subsequent examples.

PREPARATION 1

This preparation illustrates the preparation of 5-bromothiazole according to the procedure described by Beyerman et al., in *Rec. Trav. Chim.* v. 73, p. 325 (1954). In this preparation 16 ml. of concentrated nitric acid is added to a mixture containing 10 g. of 2-amino-5-bromo-thiazole in 80 ml. of concentrated phosphoric acid at room temperature. The mixture is then cooled to −10° C. and a solution containing 6 g. of sodium nitrite in 15 ml. of water is slowly added at a rate controlled to maintain the temperature below −5° C. The resulting reaction mixture is maintained at −5° C. for ½ hour and then 30 ml. of a 50% aqueous hypophosphorous acid solution is added dropwise over a period of 45 minutes. The temperature of the reaction mixture is maintained at −5° C. during this addition, and for a further period of two hours after the addition. The mixture is then poured into an ice cold aqueous solution containing 60 g. of sodium hydroxide. The resulting mixture is extracted with methylene chloride and the resulting methylene chloride extracts combined, washed with water and dried over magnesium sulfate and filtered. The solvent is then evaporated affording a residue which is then distilled under reduced pressure yielding 5-bromothiazole.

EXAMPLE 1

This example illustrates the first step of the generic process of the invention. In this example 600 mg. of sodium hydride is added to 20 ml. of glycerol acetonide under a nitrogen atmosphere. After 15 minutes, 1.5 g. of 5-bromothiazole is added and the resulting mixture is refluxed for three minutes and then distilled under reduced pressure affording 3-(thiazol-5-oxy)-propanediol 1,2-acetonide which is further purified by chromatography over silica gel.

EXAMPLE 2

This example illustrates methods according to step 2 of the first process of our invention. In this example 20 ml. of aqueous 1N-hydrochloric acid is added to a solution containing 1.5 g. of 3-(thiazol-5-oxy)-propanediol 1,2-acetonide in 150 ml. of methanol at room temperature. The reaction mixture is allowed to stand for 16 hours at room temperature and then evaporated under reduced pressure, using a small portion of toluene to remove water traces, yielding as a residue 3-(thiazoloxy)-1,2-propanediol.

EXAMPLE 3

This example illustrates methods according to steps 3 and 4 of the first process of our invention. In this example 17 g. of methane sulfonyl chloride is added to a solution containing 15 g. of 3-(thiazol-5-oxy)-1,2-propanediol in 70 ml. of dry pyridine at 0° C. The resulting mixture is maintained at 0° C. for ½ hour and then evaporated under reduced pressure to remove the pyridine solvent yielding a 2-hydroxy-1-methyl sulfonyloxy-3-(thiazol-5-oxy)-propane rich residue. The residue is then taken up in 500 ml. of anhydrous ether. Six grams of solid sodium methoxide is added to the ethyl ether-residue mixture and the resulting mixture poured over crushed ice, washed with water, dried over magnesium sulfate, filtered, and evaporated affording a residue of 1,2-epoxy-3-(thiazol-5-oxy)-propane.

EXAMPLE 4

This example illustrates methods according to the invention of converting the compounds of formula II to the corresponding compounds of formula I. In this example 2 ml. of isopropylamine is added to a solution containing 1.5 g. of 1,2-epoxy-3-(thiazol-5-oxy)-propane in 20 ml. of ethanol. The mixture is placed in a Paar-Bomb and maintained at 100° C. for ½ hour. The mixture is then evaporated to dryness yielding a crude residue of 1-isopropylamino-3-(thiazol-5-oxy)-2-propanol which is then further purified by chromatography over silica gel plates.

Similarly, 1-t-butylamino-3-(thiazol-5-oxy)-2-propanol is prepared by following the same procedure but using t-butylamine in place of isopropylamine.

EXAMPLE 5

This example illustrates further methods, of the invention, for converting the compounds of formula II to the corresponding compounds of formula I. In this example, 300 mg. of 1,2-epoxy-3-(thiazol-5-oxy)-propane is dissolved in 5 ml. of ethanol saturated with ammonia and left at room temperature for 20 hours. The reaction mixture is then evaporated to remove all residual solvent. The resulting residue is purified by thin-layer chromatography on preparative silica plate using a developing system of 1 percent triethylamine, 1.5 percent methanol and the remainder ethyl acetate to yield 1-amino-3-(thiazol-5-oxy)-propanol.

Similarly by following the same procedure but respectively replacing ammonia with methylamine, dimethylamine and ethylamine, the following compounds are respectively prepared:

1-methylamino-3-(thiazol-5-oxy)-propanol;
1-dimethylamino-3-(thiazol-5-oxy)-propanol; and
1-ethylamino-3-(thiazol-5-oxy)-propanol.

EXAMPLE 6

This example illustrates further methods according to the invention of preparing the compounds of formula I of the invention. In this example 1 g. of morpholine is added to a solution of 0.3 g. of 1,2-epoxy-3-(thiazol-5-oxy)-propane in 20 ml. of anhydrous absolute ethanol at 20° C. The resulting mixture is monitored by thin-layer chromatographic analysis and allowed to stand until conversion of 1,2-epoxy-3-(thiazol-5-oxy)-propane is essentially complete. The mixture is then evaporated to dryness yielding a crude residue of 1-(N-morpholino)-3-(thiazol-5-oxy)-2-propanol which is further purified by thin-layer chromatography.

Similarly by following the same procedure but respectively using pyrrolidine and piperidine in place of morpholine, 1-(N-pyrrolidino)-3-(thiazol-5-oxy)-2-propanol and 1-(N-piperidino)-3-(thiazol-5-oxy)-2-propanol salts are respectively prepared.

EXAMPLE 7

This example illustrates further methods according to the invention of preparing the compounds of formula I of the invention. In this example 0.6 g. of ethanolamine is added to a solution of 0.3 g. of 1,2-epoxy-3-(thiazol-5-oxy)-propane in 20 ml. of anhydrous absolute ethanol at 20° C. The resulting mixture is monitored by thin-layer chromatographic analysis and allowed to stand until conversion of 1,2-epoxy-3-(thiazol-5-oxy)-propane is essentially complete. The mixture is then evaporated to dryness yielding a crude residue of 1-(β-hydroxyethylamino)-3-(thiazol-5-oxy)-2-propanol which is further purified by thin-layer chromatography.

Similarily 1-(β-[3,4 - dimethoxyphenyl]ethyl)amino-3-(thiazol-5-oxy)-2-propanol is prepared according to the same procedure but replacing ethanolamine with 1-amino-2-(3,4-dimethoxyphenyl)ethane.

EXAMPLE 8

This example illustrates steps 1' and 2' of the alternative process of the invention. In this example 25 ml. of racemic glycidol and 50 ml. of t-butylamine are mixed together at room temperature. After about 30 minutes the mixture boils spontaneously and is then allowed to stand at room temperature for an additional 20 hours. The reaction mixture is then concentrated via evaporation to a viscous oil which is then dissolved in a solution containing 250 ml. of ethanol and 50 ml. of 37% (wt.) aqueous formaldehyde. The resulting mixture is refluxed for 18 hours and then evaporated, under vacuum, affording 5-hydroxymethyl-N-t-butyloxazolidine which is then further purified by distillation. Similarly, by following the same procedure but replacing t-butylamine with anhydrous ammonia, methylamine, isopropylamine, benzylamine, and α-methyl-β-phenylethylamine, respectively, the following compounds are respectively prepared:

5-hydroxymethyloxazolidine;
5-hydroxymethyl-N-methyloxazolidine;
5-hydroxymethyl-N-isopropyloxazolidine;
5-hydroxymethyl-N-benzyloxazolidine; and
5-hydroxymethyl-N-(α[α-methyl-β-phenylethyl])-oxazolidine.

Also in the case of the volatile reagents (i.e. ammonia and methylamine), the procedure is conducted in a closed system by first bubbling the requisite amount of ammonia or methylamine through the glycidol and then sealing the reaction vessel.

EXAMPLE 9

This example illustrates methods, according to the invention, of preparing the compounds of formula III, of the invention. In this example, 1.7 g. of 5-hydroxymethyl-N-t-butyloxazolidine in 5 ml. of anhydrous dimethylformamide is added to a suspension of 0.53 g. of sodium hydride in 5 ml. of dimethylformamide, under a nitrogen atmosphere. The resulting mixture is heated at 80° C. for 15 minutes and then cooled to room temperature and 1.66 g. of 5-bromothiazole in 10 ml. of anhydrous dimethylformamide added. The mixture is heated at 80° C. for 2 hours, then cooled to room temperature and evaporated under high vacuum affording a residue of thiazol-5'-oxy-methylene-5-N-t-butyloxazolidine.

Similarly by following the same procedure but respectively using the remaining products of Example 8 as starting materials in place of 5-hydroxymethyl-N-t-butyloxazolidine the following compounds are respectively prepared:

thiazol-5'-oxy-5-methylene-N-oxazolidine;
thiazol-5'-oxy-5-methylene-N-methyloxazolidine;
thiazol-5'-oxy-5-methylene-N-isopropyloxazolidine;
thiazol-5'-oxy-5-methylene-N-benzyloxazolidine; and
thiazol-5'-oxy-5-methylene-N-(α-[α-methyl-β-phenyl]ethyl)-oxazolidine.

EXAMPLE 10

This example illustrates methods, according to the invention, of converting the compounds of formula III into the compounds of formula I of the invention. In this example 1 g. of thiazol-5'-oxy-methylene-N-t-butyloxazolidine is dissolved in 50 ml. of ethyl acetate and this solution is washed three times with aqueous 5% sodium hydroxide (20 ml.) at 20° C. The mixture is allowed to stand for 0.5 hours, washed with water, dried over magnesium sulfate and then evaporated to dryness affording 1-t-butylamino-3-(thiazol-5-oxy)-2 - propanol, which is then further purified by chromatography on silica gel plates.

Similarly by following the same procedure, the products of formula III, of Example 9, are respectively hydrolyzed to the corresponding compounds of formula I.

EXAMPLE 11

This example illustrates alternate methods, according to the invention, for converting compounds of formula III to compounds of formula I. In this example 1 g. of thiazol-5'-oxy-methylene-N-t-butyloxazolidine is dissolved in 20 ml. of methanol containing 4 cc. of 5% aqueous hydrochloric acid at 20° C. After 15 minutes, the mixture is neutralized with dilute aqueous sodium carbonate solution, poured into water and extracted with ethyl acetate.

The ethyl acetate extract is evaporated to dryness yielding 1-t-butylamino-3-(thiazol-5-oxy)-2-propanol.

Similarly by following the same procedure, the products of formula III, of Example 9, are respectively hydrolyzed to the corresponding compounds of formula I.

EXAMPLE 12

This example illustrates methods, according to the invention, of converting compounds of formula I into compounds of formula III of the invention. In this example 1 g. of 1 - isopropylamino-3-(thiazol-5-oxy)-2-propanol is dissolved in 25 ml. of acetone at 20° C., and 2 g. of aluminum isopropoxide is then added. The solution is stirred for 4 days at 20° C. and then 50 ml. of hexane and 5 ml. of water are added and the resulting mixture is allowed to stand for 15 minutes. The resulting hexane phase is separated and then evaporated to dryness yielding thiazol-5'-oxy-5-methylene-N-isopropyl-2,2-dimethyloxazolidine.

Similarly by following the same procedure, the products of formula I, of Examples 4 and 5, are respectively converted into the corresponding compounds of formula III.

Similarly the corresponding thiazol-5'-oxy-5-methylene-N-isopropyl-2-spiro-cyclohexyloxazolidine compounds of formula III are prepared according to the same procedure but using cyclohexanone in place of acetone.

EXAMPLE 13

This example illustrates further methods, according to the invention, of converting the compounds of formula I into the corresponding compounds of formula III. In this example 380 mg. of 1-isopropylamino-3-(thiazol-5-oxy)-2-propanol and a molar equivalent amount of cyclohexanone are dissolved in 15 ml. of ethyl ether at 20° C. and 0.3 g. of anhydrous potassium carbonate is then added. The mixture is stirred for 18 hours at room temperature and then filtered. The filtrate is evaporated to dryness yielding thiazol - 5' - oxy - 5 - methylene-N-isopropyl-2-spiro-cyclohexyloxazolidine.

Similarly by following the same procedure, the products of formula I, of Examples 4 and 5, are respectively converted into the corresponding 2-spiro-cyclohexyl-oxazolidine compounds of formula III.

EXAMPLE 14

This example illustrates methods of preparing hydrochloride addition salts of the invention. In this example 1 g. of 1 - isopropylamino-3-(thiazol-5-oxy)-2-propanol is dissolved in 10 ml. of ethyl ether at 20° C. A stream of gaseous anhydrous hydrogen chloride is passed over the surface of the solution until the supernatant liquid becomes colorless. The resulting precipitate is collected by filtration, washed with ethyl ether and then crystallized from methanol, containing 1% water and 1% acetone, affording crystalline 1-isopropylamino-3-(thiazol-5-oxy)-2-propanol hydrochloride.

Similarly by following the same procedure using each of the products of formula I, of Examples 4–7 and 10 as starting materials, the corresponding hydrochloride addition salts of each of these compounds is respectively prepared.

EXAMPLE 15

This example illustrates methods of preparing the maleate addition salts of the invention. In this example 1 gram of 1-isopropylamino-3-(thiazol-5-oxy)-2-propanol is dissolved in a solution of 5 ml. of ethyl ether and 5 ml. of ethanol at 20° C. To this solution is added 10 ml. of a saturated solution of maleic acid in ethyl ether. The mixture is allowed to stand for 1 hour at room temperature. The resulting precipitate is recovered by filtration, washed three times with ethyl ether and then crystallized from a 1:1, by vol., solution of ethyl ether and ethanol affording crystalline 1-isopropylamino - 3 - (thiazol-5-oxy)-2-propanol maleate salt.

Similarly by following the same procedure using each of the products of formula I, of Examples 4–7 and 10 as starting materials, the corresponding maleate addition salts of each of these compounds is respectively prepared.

EXAMPLE 16

This example illustrates the preparation, according to the invention, of the pure (+) optical isomers of the compounds of formulas I, II and III. In this example, the procedures of Examples 1–15 are repeated but in this instance, in place of racemic glycerol acetonide, the pure (+) optical isomer of glycerol acetonide is used as starting material in Example 1; and in Example 8, the pure (+) optical isomer of glycidol is used in place of racemic glycidol.

EXAMPLE 17

This example illustrates the preparation, according to the invention, of the pure (−) optical isomers of the compounds of formulas I, II and III. In this example, the procedures of Examples 1–15 are repeated but in this instance, in place of racemic glycerol acetonide, the pure (−) optical isomer of glycerol acetonide is used as starting material in Example 1, and in Example 8, the pure (−) optical isomer of glycidol is used in place of racemic glycidol.

Obviously many modifications and variations of the invention described herein above and below and in the Claims can be made without departing from the essence and scope thereof.

What is claimed is:

1. A compound selected from the group having the formula:

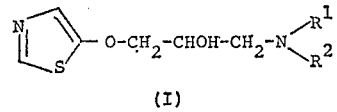

(I)

wherein
$R^1$ and $R^2$ are independently selected from the group of hydrogen, lower alkyl, cycloalkyl having from 3 through 7 ring atoms, phenyl, phenylalkyl having up to 10 carbon atoms, alkylphenyl having up to 10 carbon atoms, hydroxy lower alkyl, (lower alkoxy) lower alkyl, adamantyl, and the group having the formulas —R'X or

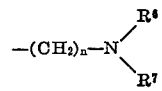

wherein R' is lower alkyl, X is morpholino, pyrrolidino, or piperidino, $R^6$ and $R^7$ are independently hydrogen or lower alkyl, and n is a whole integer of from 2 to 6; or $R^1$ and $R^2$ together with the nitrogen atom to which they are joined form a nitrogen heterocycle selected from the group of morpholine, pyrrolidine, and piperidine; and pharmaceutically acceptable salts thereof.

2. The compound of Claim 1, and pharmaceutically acceptable salts thereof, wherein one of $R^1$ and $R^2$ is hydrogen and the other is selected from the group of hydrogen, methyl, isopropylamino, t-butylamino, β-hydroxyethylamino and β-(3,4-dimethoxyphenyl)-ethylamino.

3. The compound of Claim 1, and pharmaceutically acceptable salts thereof, wherein said compound is 1-isopropylamino-3-(thiazol-5-oxy)-2-propanol.

4. The pharmaceutically acceptable salt of Claim 3 wherein said salt is 1-isopropylamino-3-(thiazol-5-oxy)-2-propanol hydrochloride.

5. The compound of Claim 1, and pharmaceutically acceptable salts thereof, wherein said compound is 1-β-hydroxyethylamino-3-(thiazol-5-oxy)-2-propanol.

6. The compound of Claim 1, and pharmaceutically acceptable salts thereof, wherein said compound is 1-methylamino-3-(thiazol-5-oxy)-2-propanol.

7. The compound of Claim 1, and pharmaceutically acceptable salts thereof, wherein said compound is 1-amino-3-(thiazol-5-oxy)-2-propanol.

8. The compound of Claim 1, and pharmaceutically acceptable salts thereof, wherein said compound is 1-t-butylamino-3-(thiazol-5-oxy)-2-propanol.

9. The compound of Claim 1, and pharmaceutically acceptable salts thereof, wherein said compound is 1-($\beta$-[3,4-dimethoxyphenyl])-ethylamino - 3 - (thiazol-5-oxy)-2-propanol.

10. The pharmaceutically acceptable salts of Claim 1.

11. The pharmaceutically acceptable salt of Claim 10 wherein said salt is a hydrochloride addition salt.

12. The pharmaceutically acceptable salt of Claim 10 wherein said salt is a maleate addition salt.

References Cited
UNITED STATES PATENTS

| | | | |
|---|---|---|---|
| 3,328,417 | 6/1967 | McLoughlin et al. | 260—302 R |
| 3,631,055 | 12/1971 | Posselt et al. | 260—302 R |

RICHARD J. GALLAGHER, Primary Examiner

U.S. Cl. X.R.

260—243 B, 247.1, 268 H, 293.68, 294.80, 307 F, 570.6, 584 B, 999